(12) United States Patent
Atar et al.

(10) Patent No.: US 9,527,142 B2
(45) Date of Patent: Dec. 27, 2016

(54) HIGH SPEED MILLING TOOL AND TANGENTIAL RAMPING MILLING INSERT THEREFOR

(71) Applicant: Iscar, Ltd., Tefen (IL)

(72) Inventors: Osama Atar, Yarka (IL); Amir Satran, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 441 days.

(21) Appl. No.: 13/770,512

(22) Filed: Feb. 19, 2013

(65) Prior Publication Data
US 2014/0234036 A1 Aug. 21, 2014

(51) Int. Cl.
*B23C 5/20* (2006.01)
*B23C 5/10* (2006.01)

(52) U.S. Cl.
CPC ............ *B23C 5/207* (2013.01); *B23C 5/109* (2013.01); *B23C 2200/085* (2013.01); *B23C 2200/208* (2013.01); *B23C 2200/367* (2013.01); *B23C 2210/66* (2013.01); *Y10T 407/192* (2015.01); *Y10T 407/1924* (2015.01); *Y10T 407/235* (2015.01)

(58) Field of Classification Search
CPC ...... Y10T 407/1948; B23C 5/22; B23C 5/109; B23C 2210/168; B23C 2200/085; B23C 2200/208; B23C 2200/367; B23C 5/207
USPC ............... 407/101–105, 42, 55, 56, 58, 59, 61–63,407/113
See application file for complete search history.

(56) References Cited

U.S. PATENT DOCUMENTS

| | | | |
|---|---|---|---|
| 5,984,592 A * | 11/1999 | Harper et al. | 407/40 |
| 6,053,672 A * | 4/2000 | Satran et al. | 407/40 |
| 6,527,485 B1* | 3/2003 | Little | 407/24 |
| 6,733,215 B2* | 5/2004 | Isaksson | B23B 27/045 407/114 |
| 6,935,814 B2* | 8/2005 | Nagaya | B23C 5/207 407/100 |
| 7,001,115 B2 | 2/2006 | Erickson et al. | |
| 7,070,363 B2 | 7/2006 | Long, II et al. | |
| 7,094,007 B2* | 8/2006 | Satran | B23C 5/06 407/113 |
| 7,104,735 B2* | 9/2006 | Johnson | B23C 5/06 407/113 |

(Continued)

OTHER PUBLICATIONS

International Search Report dated Jun. 20, 2014 issued in PCT counterpart application (No. PCT/IL2014/050079).

*Primary Examiner* — Sara Addisu
(74) *Attorney, Agent, or Firm* — Womble Carlyle

(57) ABSTRACT

A single-sided tangential ramping milling insert for high speed milling includes opposite insert seating and top surfaces and a peripheral surface which extends therebetween. The milling insert has a reference plane (P) which passes through the entire peripheral surface, midway between the seating and top surfaces. The peripheral surface includes two opposite side surfaces. Each side surface includes a first cutting edge, a second cutting edge connected to the first cutting edge and extending transversely thereto, a ramping cutting edge connected to the second cutting edge and located opposite the first cutting edge, and a rake surface which extends from at least a portion of the first cutting edge toward the insert seating surface. The milling insert includes two ramping relief surfaces, each of which extends from a ramping cutting edge of one side surface towards the first cutting edge of the opposite side surface.

24 Claims, 3 Drawing Sheets

(56) References Cited

U.S. PATENT DOCUMENTS

| | | | |
|---|---|---|---|
| 7,270,503 B2* | 9/2007 | Berger et al. | 408/199 |
| 7,410,331 B2* | 8/2008 | Ejderklint | B23C 5/06 407/113 |
| 7,494,303 B2* | 2/2009 | Koskinen | B23C 5/06 407/113 |
| 7,901,161 B2* | 3/2011 | Jansson | B23C 5/06 407/113 |
| 7,909,544 B2* | 3/2011 | Jansson | B23C 5/06 407/100 |
| 8,192,114 B2* | 6/2012 | Chang | 408/224 |
| 8,202,026 B2* | 6/2012 | Satran | B23C 5/207 407/113 |
| 8,696,254 B2* | 4/2014 | Satran | 407/34 |
| 8,708,617 B2* | 4/2014 | Choi et al. | 407/114 |
| 2003/0223828 A1* | 12/2003 | Craig | 407/35 |
| 2006/0013661 A1* | 1/2006 | Long et al. | 407/113 |
| 2007/0071561 A1* | 3/2007 | Agic | B23B 27/16 407/34 |
| 2008/0044241 A1* | 2/2008 | Koskinen | B23C 5/06 407/103 |
| 2008/0187403 A1 | 8/2008 | Ertl et al. | |
| 2008/0226403 A1* | 9/2008 | Craig | B23C 5/207 407/113 |
| 2011/0020080 A1* | 1/2011 | Zettler | B23C 5/06 407/113 |
| 2011/0299946 A1* | 12/2011 | Hecht | B23C 5/207 407/42 |
| 2012/0027530 A1 | 2/2012 | Agic | |
| 2013/0108387 A1* | 5/2013 | Ishi | B23C 5/109 409/132 |
| 2013/0121775 A1* | 5/2013 | Dudzinsky et al. | 407/42 |
| 2013/0129433 A1* | 5/2013 | Matsumoto | B23C 5/08 407/51 |
| 2013/0129434 A1* | 5/2013 | Bhagath | B23C 5/08 407/51 |
| 2014/0212228 A1* | 7/2014 | Horiike et al. | 407/42 |
| 2014/0348599 A1* | 11/2014 | Kovac et al. | 407/42 |
| 2015/0037106 A1* | 2/2015 | Kovac | 407/33 |
| 2015/0139743 A1* | 5/2015 | Ballas | 407/48 |

* cited by examiner

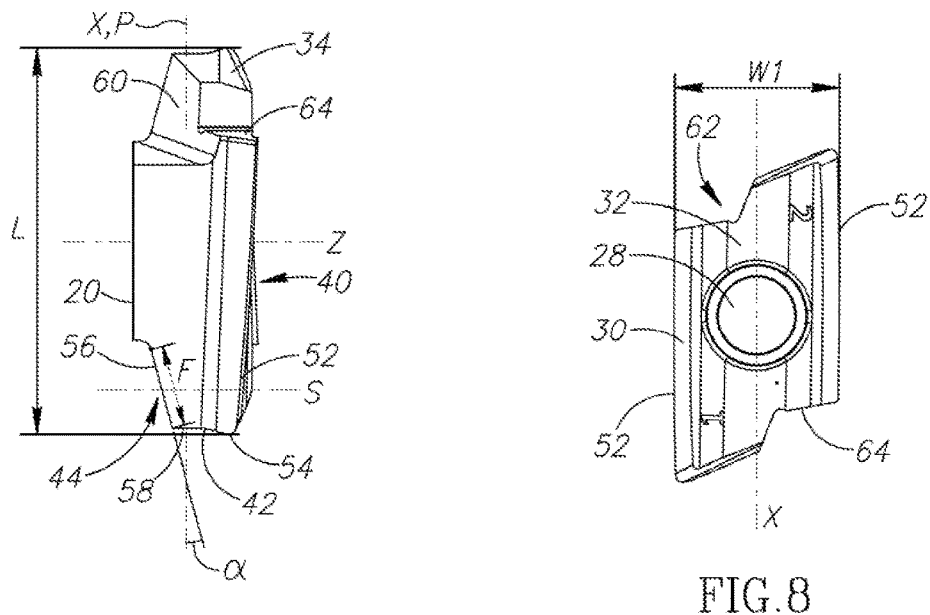
FIG.7
FIG.8
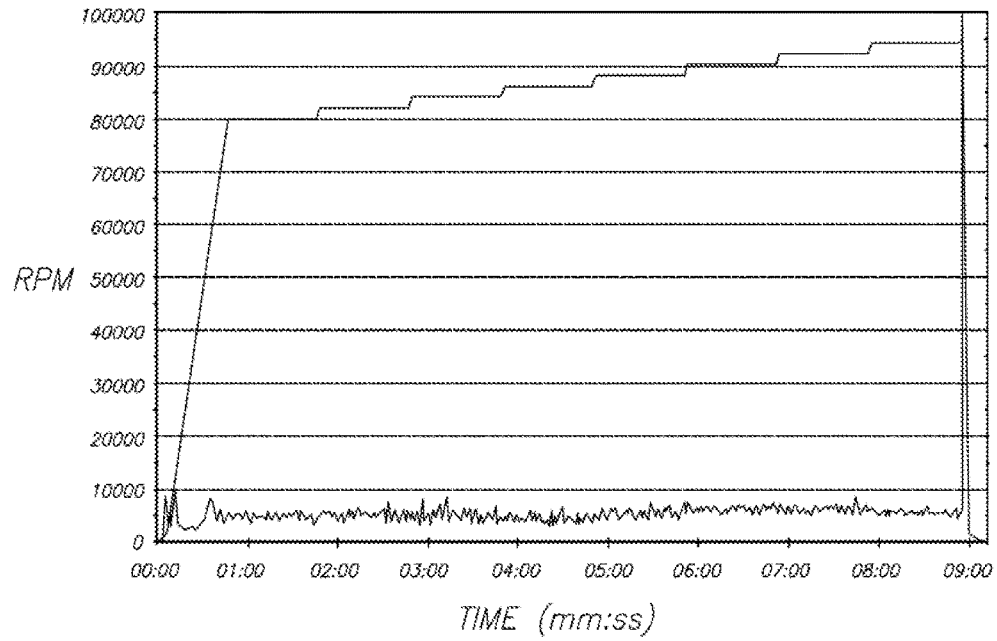
Plot of RPM and vibration noise level as a function of time;
upper line shows RPM; lower line shows vibration noise level
FIG.9

HIGH SPEED MILLING TOOL AND TANGENTIAL RAMPING MILLING INSERT THEREFOR

FIELD OF THE INVENTION

The subject matter of the present application relates to high speed milling tools. For example, cutting tools of the field can machine at speeds exceeding 33,000 RPM. Specifically, it relates to milling tools configured for machining soft metals and ramping.

BACKGROUND OF THE INVENTION

Milling tools of the field are known and disclosed, for example, in U.S. Pat. No. 7,070,363.

SUMMARY OF THE INVENTION

In accordance with the subject matter of the present application there is provided a single-sided tangential ramping milling insert for high speed milling which includes opposite insert seating and top surfaces, and a peripheral surface extending therebetween, the milling insert having a reference plane (P) passing through the entire peripheral surface, midway between the seating and top surfaces. The peripheral surface comprises two opposite side surfaces having a first axis (X) passing midway therebetween and lying in the reference plane (P). Each side surface includes:
a first cutting edge formed at an intersection of the side surface (26) and the insert top surface (22),
a second cutting edge connected to the first cutting edge and extending transversely thereto,
a ramping cutting edge connected to the second cutting edge and located opposite the first cutting edge, and
a rake surface extending from at least a portion of the first cutting edge towards the insert seating surface. The milling insert comprises two ramping relief surfaces, each of which extends from a ramping cutting edge of one side surface towards the first cutting edge of the opposite side surface.

In accordance with the subject matter of the present application there is further provided a high speed milling tool which has a rotation axis R and includes a tool body and the above-described milling insert secured in a pocket of the tool body. The pocket includes a pocket seating surface and pocket abutment and support surfaces which extend transversely to the pocket seating surface. The insert seating surface abuts the pocket seating surface, at least a portion of the rake surface abuts the pocket abutment surface, and the insert support surface abuts the pocket support surface.

Any of the following features, either alone or in combination, may be applicable to any of the above aspects of the subject matter of the application:

Each ramping relief surface extends from a ramping cutting edge of one side surface and at least partially meets the rake surface of the opposite side surface.

The ramping relief surfaces can be planar.

At least a portion of the ramping cutting edge can be straight.

The ramping cutting edge can include a straight first ramping edge and a second ramping edge connected transversely thereto.

The second ramping edge is connected to the second cutting edge.

The second cutting edge can be raised above the second ramping edge.

In a plan view of each rake surface, the first ramping edge forms a ramping edge angle ($\alpha$) with the reference plane (P).

The ramping edge angle can be between 0° and 45°.

The ramping edge angle can be between 7° and 20°.

The milling insert can include a clamping bore which opens out to the insert seating and top surfaces, the clamping bore has a third axis (Z) perpendicular to the reference plane (P), and the milling insert has 180° rotational symmetry about the third axis (Z).

The first cutting edge is formed at least at an intersection of the insert top surface and a respective side surface.

At least portion of the first cutting edge can be helical.

The first cutting edge can include a main cutting edge connected to a corner cutting edge.

At least a portion of the rake surface can extend inwardly.

The rake surface can include an inwardly extending first rake surface and a second rake surface which extends transversely therefrom.

The rake surface can include a ramping rake surface which extends from the ramping cutting edge towards the top surface.

The milling insert includes two insert support surfaces, each of which extends from the top surface towards the insert seating surface.

The milling inserts can project a maximum projection (M) from a tool body end in the rotation axis R direction.

The maximum projection (M) can be larger than a quarter of an insert length (L).

The milling insert can be secured in the pocket via a screw which passes through the clamping bore and screw threaded into a threaded screw bore which opens out to the pocket seating surface.

BRIEF DESCRIPTION OF THE DRAWINGS

For a better understanding of the subject matter of the present application and to show how the same may be carried out in practice, reference will now be made to the accompanying drawings, in which:

FIG. 7 is a side view of the milling insert along a second axis Y;

FIG. 8 is a plan view of a top surface of the milling insert; and

FIG. 9 is a graph comparing vibration level with tool speed in a milling tool employing the tangential cutting insert of FIG. 4.

Figure 1:
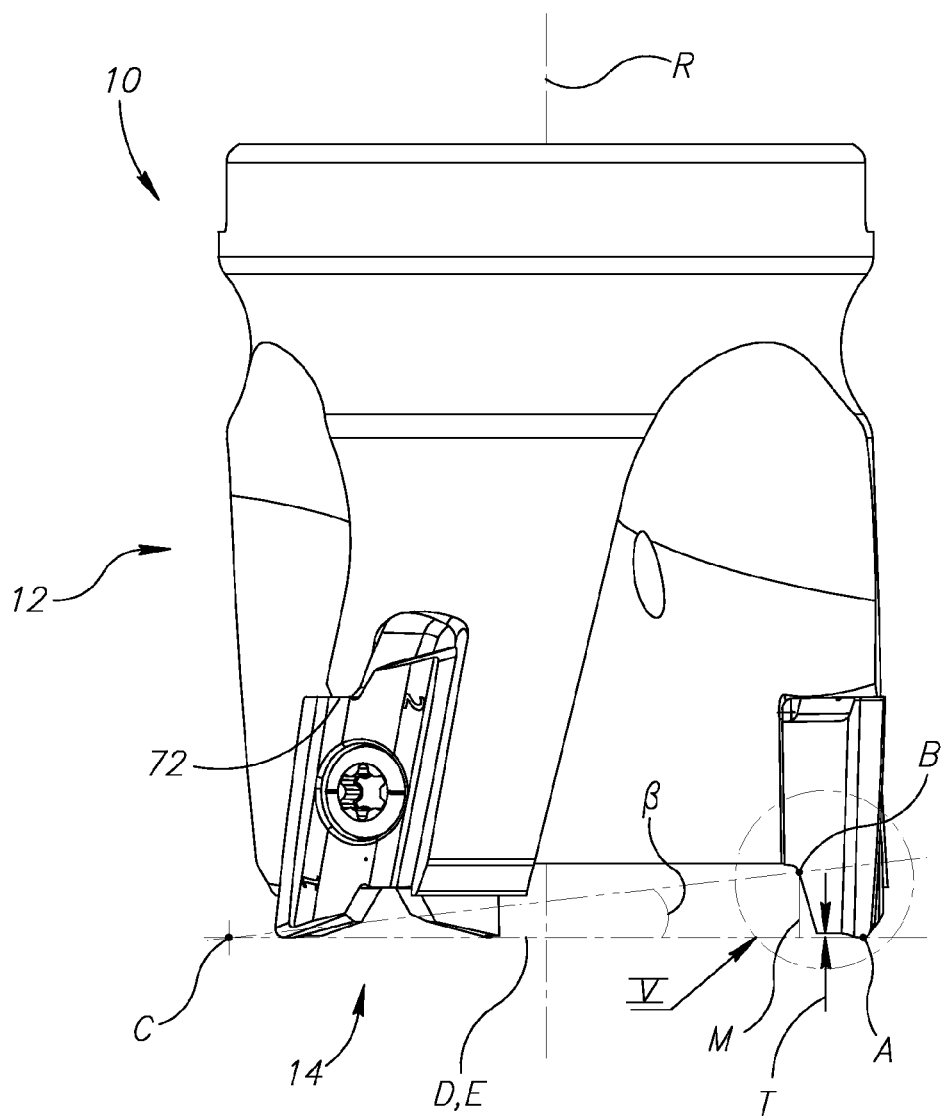
FIG. 1 is a side view of an assembled high speed milling tool.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
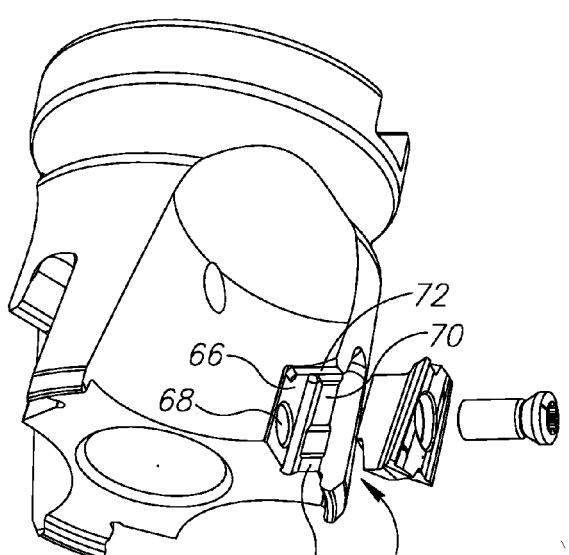
FIG. 2 is an isometric partial exploded view of the milling tool of FIG. 1.

Reference is made to FIGS. 1 and 2. A high speed milling tool 10 for milling soft metals has a rotation axis R, includes a tool body 12 and can include three tangential milling inserts 14 secured in pockets 16 at a tool body end 18. The milling inserts 14 project from the tool body end 18 in the rotation axis R direction.

Attention is drawn to FIGS. 4-8. Each milling insert 14 includes an insert seating surface 20, an opposite insert top surface 22 and a peripheral surface 24 which extends therebetween. The peripheral surface 24 includes two opposite side surfaces 26. Each milling insert 14 has a reference plane P which passes through the entire peripheral surface 24, midway between the insert seating and top surfaces 20, 22. The seating surface 20 can have at least a flat portion which is parallel to the reference plane P.

The insert has a first axis X which passes through the peripheral surface 24, midway between the side surfaces 26 and lies in the reference plane P. The milling insert 14 has a second axis Y, which also lies in the reference plane P and transversely intersects the first axis X. The second axis Y can be perpendicular to the first axis X. The insert can have a clamping bore 28 which opens out only to the insert seating and top surfaces 20, 22. The clamping bore 28 has at least a cylindrical portion which defines a third axis Z. The third axis Z is perpendicular to the reference plane P and intersects both the first and second axes X, Y. The insert has 180° rotational symmetry about the third axis Z. In a plan view of the insert top surface 22 along the third axis Z (FIG. 8), the insert has a first width W1, measured perpendicular to the first axis X. The first width W1 is shorter than an insert length L. In a plan view of any of the side surfaces 26 along the second axis Y (FIG. 7) the insert length L is measured between outer most portions of the insert in the first axis X direction. In the same view, the insert has a second width W2, measured between outer most points of the insert seating and top surfaces 20, 22 in the third axis Z direction.

The insert top surface 22 can have a convex shape. The insert top surface 22 can include two first relief surfaces 30 and a recessed surface 32 which extends therebetween. For accuracy purposes, the first relief surfaces 30 are ground. At least proximate each first relief surface 30, the recessed surface 32 is located closer to the reference plane P than each respective first relief surface 30. This design is chosen to ensure that the recessed surface 32 doesn't participate in the grinding process of the first relief surfaces 30, thus reducing grinding costs. The peripheral surface 24 further includes two opposite second relief surfaces 34, each of which extends from a respective side surface 26 towards the reference plane P. In a view along the first axis X, each second relief surface 34 is located between the side surfaces 26 and between the insert seating and top surfaces 20, 22.

In the present example, each side surface 26 includes a single cutting portion 36, located at a given end thereof. Each cutting portion 36 includes a rake surface 38, a first cutting edge 40, a second cutting edge 42 and a ramping cutting edge 44.

Figure 6:
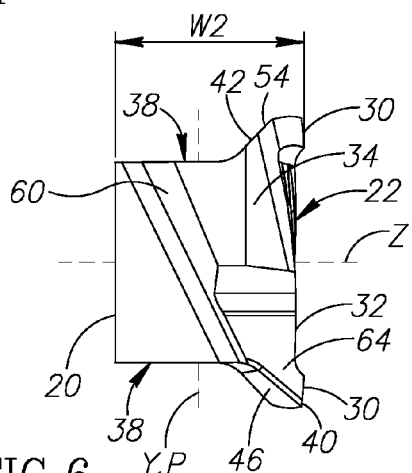
FIG. 6 is a side view of the milling insert along a first axis X.

Each rake surface 38 can include first and second rake surfaces 46, 48. The second rake surfaces 48 can be planar. The second rake surfaces 48 can be parallel. The second rake surfaces 48 can be perpendicular to the reference plane P. Each second rake surface 48 can extend transversely from the first rake surface 46 and it meets the insert seating surface 20. The second rake surfaces 48 can be configured to either deflect, evacuate or form chips cut by the cutting edges. In the present example, the second rake surface 48 is also configured for abutment. The rake surface 38 further includes a ramping rake surface 50 which extends from the ramping cutting edge 44 towards the insert top surface 22. According to the present example, the first rake surface 46 extends from the insert top surface 22, inwards, and forms an acute angle with the insert top surface 22 (FIG. 6).

The first cutting edge 40 is formed at an intersection of the rake surface 38 and the insert top surface 22. Specifically, the first cutting edge 40 is formed at an intersection of the first rake surface 46 and a respective adjacent first relief surface 30. The first cutting edge 40 includes a main cutting edge 52 and a corner cutting edge 54 connected thereto. The main cutting edge 52 extends generally in the first axis X direction. The main cutting edge 52 is longer than the corner cutting edge 54. The main cutting edge 52 can be helical. At least a portion of the corner cutting edge 54 can be curved. The corner cutting edge 54 can follow a circular path. The main cutting edge 52 is connected to the second cutting edge 42 via the corner cutting edge 54.

Figure 5:
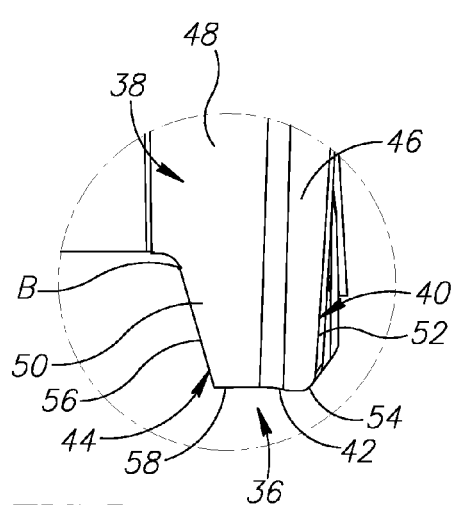
FIG. 5 is a detail, plan view of a cutting portion of the milling tool of FIG. 1.

The second cutting edge 42 is formed at an intersection of the rake surface 38 and the second relief surface 34. The second cutting edge 42 is configured for wiping operations, i.e., smoothing a workpiece surface. According to the present example, the second cutting edge 42 can be the shortest of the cutting edges. During machining, when the milling tool 10 does not proceed in the direction of the axis of rotation R, the second cutting edge 42 performs only wiping operations. When the milling insert 14 is in an assembled position in the pocket 16 of the milling tool 10 (FIGS. 1 and 5), in a view of the rake surface 38, perpendicular to the rotation axis R, the second cutting edge 42 can appear straight (FIGS. 1, 5 and 7). In the same position and view, the second cutting edge 42 can appear perpendicular to the rotation axis R. In the same view, the second cutting edge 42 can appear perpendicular to the main cutting edge 52. The second cutting edge 42 is connected to the ramping cutting edge 44.

The ramping cutting edge 44 can include a first ramping edge 56 and a second ramping edge 58 connected transversely thereto. The first ramping edge 56 is connected to the second cutting edge 42 via the second ramping edge 58. The first ramping edge 56 is located opposite the first cutting edge 40 in the sense that, in a side view along the second axis Y, the first cutting edge 40 and the first ramping edge 56 are spaced apart from one another, and a line S parallel to the third axis Z can be seen passing through both edges 40, 56 (see FIG. 7). The first ramping edge 56 can be straight. In a plan view of the rake surface 38, along the second axis Y (FIG. 7) the first ramping edge 56 forms an acute ramping edge angle α with the reference plane P. As such, in the side view along the second axis Y, the main cutting edge 52 portion of first cutting edge 40, and the first ramping edge 56 portion of the ramping cutting edge 44, are spaced apart from one another and converge outwardly, along the first axis X. In the same view, the first ramping edge 56 has a first ramping edge length F. Depending on the application, the ramping edge angle α can be between 0 and 45 degrees. According to some embodiments, the ramping edge angle is between 7 and 20 degrees. In the present example, the ramping edge angle is 15 degrees.

It is noted that in FIGS. 1 and 5, due to the custom positioning of the milling insert 14 in the tool body 12, the milling insert 14 is shown a few degrees askew, or offset, from the view of the rake surface 38 (along the second axis Y) of the milling insert 14 as shown in FIG. 7. Stated differently, in the assembled position of the milling tool 10, the milling insert 14 is only slightly rotated about the third axis Z. Therefore, in FIG. 7, the ramping edge angle appears the same as in FIGS. 1 and 5. Nonetheless, the ramping edge angle α is measured only on the milling insert 14, independently of the tool body 12.

In the assembled position of the milling tool 10, in a plan view of the rake surface 38 along the second axis Y, perpendicular to the rotation axis R, the second cutting edge 42 is raised a relief distance T above the second ramping edge 58. The relief distance T can be very short in comparison to the first ramping edge length F. Independently of the milling tool, the second ramping edge 58 is located further inwards, than the second cutting edge 42. As a result, during machining, when the milling tool 10 does not proceed in the direction of the rotation axis R, the second ramping edge 58 is relieved from the work piece, i.e., does not contact the workpiece. Only during ramping operations, the milling tool 10 proceeds at least along the rotation axis R, and the first cutting edge 40, the second cutting edge 42 and the ramping cutting edge 44 can all participate in the machining process. The second ramping edge 58 connects the first ramping edge 56 with the second cutting edge 42. This can be partly in order to maintain certain geometrical features of the milling insert 14, e.g., values of the ramping edge angle α. Furthermore, in the present example, the second ramping edge 58 can contribute to (while other features are left unchanged) an enlarged second width W2, which in turn can increases robustness of the milling insert 14, and its resistance to breakage.

Each milling insert 14 includes two ramping relief surfaces 60, each of which extends from a ramping cutting edge 44 of one side surface 26 towards the first cutting edge 40 of the opposite side surface 26. In the present example, each ramping relief surface 60 extends from a rake surface 38 of one side surface 26 and partially meets a rake surface 38 of the opposite side surface 26. Each ramping relief surface 60 can be planar.

Each milling insert 14 has a step-shaped recess 62 on opposite ends thereof along the first axis X. Each recess 62 includes an insert support surface 64. The insert support surfaces 64 can be planar. Each insert support surface 64 can extend substantially in the second axis Y direction and generally faces in the first axis X direction. According to the present example, each insert support surface 64 extends from the insert top surface 22 towards the insert seating surface 20 and meets, partially a respective ramping relief surface 60, and partially a respective adjacent rake surface 38. In the present example, the orientation of the insert support surfaces 64 is chosen to counter machining forces applied on the milling insert 14 during machining, and prevent movement of the milling insert 14 in the pocket 16.

Figure 3:
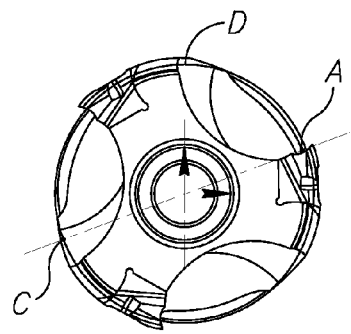
FIG. 3 is an axial bottom view of the milling tool of FIG. 1.
Figure 4:
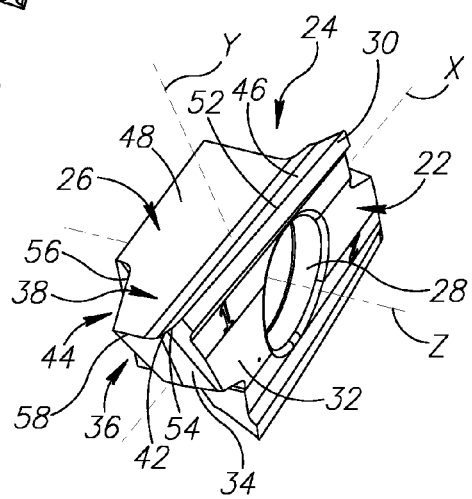
FIG. 4 is an isometric view of a tangential milling insert.

As will be further explained, the ramping edge angle α and the first ramping edge length F indirectly affect a maximum ramping angle β of the milling tool 10, and as a result, the ramping capabilities of the milling tool 10. As a general definition, the ramping angle β is the angle at which the milling tool 10 proceeds inwards and sideways (with reference to a planar face of the workpiece which is perpendicular to the rotation axis R) during ramping machining. In the assembled position of the milling tool 10, the ramping angle β can be defined in a side view of the milling tool 10 (FIG. 1), by three points. A, B and C. Point A is defined, in any of the milling inserts 14, as an outer-most point of the milling tool 10 in the rotation axis R direction. In the present example, point A is located on the second cutting edge 42 of one of the cutting inserts, which is viewed from a plan view of its rake surface 38 (FIG. 1). Point A lies in, and defines, a virtual end plane E, which is perpendicular to the rotation axis R. In the same view, point B is located on the ramping cutting edge 44 of the same milling insert 14, and it is the farthest point from the end plane E participating in the cutting process during ramping machining. A virtual circle D is defined by the point A, about the rotation axis R (shown in FIG. 3), oriented perpendicular to the rotation axis R and lying in the end plane E. It is understood, however, that the virtual circle D does not define cutting diameter of the milling tool 10. In the same view, point C is the farthest point from point A, located on the virtual circle D (FIG. 1). The ramping angle β is formed between lines CB and CA. According to some embodiments, the maximum ramping angle β can be 8°. This is an exceptionally large, and unusual, ramping angle β for a tangentially mounted milling insert in the present field.

In FIG. 1 it can be seen that the ramping angle β is mainly affected, or its value determined by, a maximum projection M of the milling insert 14 in the rotation axis R direction. In other words, the maximum projection M is the shortest distance between point B and the end plane E. A close mathematic representation of the maximum projection M can be, e.g., M=cos (α)*F+T. In the assembled position, the maximum projection M is the length of the portion of the insert which projects in the rotation axis R direction beyond the tool body end 18 (FIG. 1) and capable of ramping machining. The maximum projection M can satisfy the following relation with the insert length L, M≥L/4. This is advantageous, since the ramping relief surfaces 60 can be designed with the abovementioned, relatively extreme, orientation for increasing the ramping rotation speeds and ramping machining performance. In other words, the magnitude of the maximum projection M can greatly contribute to the orientation of the ramping relief surfaces 60, since it allows the skilled person to have a certain freedom in designing the ramping relief surfaces 60 orientation.

The tangential orientation of the milling insert 14 in the milling tool 10 is advantageous because it almost eliminates tearing forces on the screw.

Another advantage related to the tangential orientation and robustness, is that the milling insert 14 does not require tool support (projection from tool, behind the milling insert 14) behind the cutting edges.

According to the present example, the tool body 12 has a cylindrical shape and three pockets 16 at the tool body end 18. Each pocket 16 includes a pocket seating surface 66 which is oriented tangentially with respect to the rotation axis R. Each pocket 16 can include a pocket bore 68 which opens out to the pocket seating surface 66. Each pocket 16 further includes a pocket abutment surface 70 which extends transversely to the pocket sating surface. The pocket abutment surface 70 can have two abutment sub-surfaces. Each pocket 16 further includes a pocket support surface 72 which is oriented transverse to the pocket seating surface 66 and to the pocket abutment surfaces 70.

In the assembled position, the insert seating surface 20 abuts the pocket seating surface 66. The second rake surface 38 abuts the pocket abutment surface 70 and the insert support surface 64 abuts the pocket support surface 72. In the present example, the pocket 16 includes a screw which is located in the clamping bore 28 and screw threaded into the pocket bore 68.

In addition to the relatively high ramping angle β, the combination between the tangential orientation of the milling insert 14 and its robustness leads to surprisingly high rotation-speed results. High rotation-speed tests performed on the present milling insert 14 by the Technical University of Darmstadt proved that it can withstand speeds of about 94,000 RPM before breakage. When taking into account a security factor of 2, during high-speed machining, speeds can reach 47,000 RPM, which are believed to be the highest machining rotation speeds possible today. The rotation-speed test results (RPM vs. TIME) are presented in the graph seen in FIG. 9. As seen in the graph of FIG. 9, even as the number of revolutions per minute increases past 80,000 RPM, the level of vibrations remains relatively constant.

Advantages of higher speeds may lead to shorter machining times and therefore reduced machining costs.

The description above includes exemplary embodiments and details for enablement, if needed, of claimed subject matter, and does not exclude non-exemplified embodiments and details from the claim scope of the present application.

What is claimed is:

1. A single-sided tangential ramping milling insert (14) for high speed milling comprising opposite insert seating and top surfaces (20, 22), and a peripheral surface (24) extending therebetween, the milling insert (14) having a reference plane (P) passing through the entire peripheral surface (24), midway between the seating and top surfaces (20, 22),
   the peripheral surface (24) comprising two opposite side surfaces (26) having a first axis (X) passing midway therebetween and lying in the reference plane (P), each side surface (26) comprising:
   a first cutting edge (40) formed at an intersection of the side surface (26) and the insert top surface (22),
   a second cutting edge (42) connected to the first cutting edge (40) and extending transversely thereto in a direction of the insert seating surface (20),
   a ramping cutting edge (44) connected to the second cutting edge (42) and extending further in said direction of the insert seating surface (20), the ramping cutting edge (44) and the first cutting edge (40) being spaced apart from one another in a side view of said each side surface (26); and
   a rake surface (38) extending from at least a portion of the first cutting edge (40) towards the insert seating surface (20),
   wherein
   the milling insert (14) has 180° rotational symmetry about a third axis (Z) which is perpendicular to the reference plane (P), but lacks 90° rotational symmetry about said third axis (Z); and
   the milling insert (14) comprises two ramping relief surfaces (60), each of which extends from the ramping cutting edge (44) of one side surface (26) towards the first cutting edge (40) of the opposite side surface (26), said one side surface (26) having 180° rotational symmetry with said opposite side surface (26) about said third axis (Z).

2. The milling insert (14) according to claim 1, wherein each ramping relief surface (60) extends from a ramping cutting edge (44) of one side surface (26) and at least partially meets the rake surface (38) of the opposite side surface (26).

3. The milling insert (14) according to claim 1, wherein the ramping relief surfaces (60) are planar.

4. The milling insert (14) according to claim 1, wherein at least a portion of the ramping cutting edge (44) is straight.

5. The according to claim 1, wherein the ramping cutting edge (44) comprises a straight first ramping edge (56) and a second ramping edge (58) connected transversely thereto; and wherein the second ramping edge (58) is connected to the second cutting edge (42).

6. The milling insert (14) according to claim 5, wherein the second cutting edge (42) is raised above the second ramping edge (58).

7. The milling insert (14) according to claim 5, wherein in a plan view of each rake surface (38), the first ramping edge (56) forms a ramping edge angle ($\alpha$) with the reference plane (P).

8. The milling insert (14) according to claim 7, wherein the ramping edge angle is between 0° and 45°.

9. The milling insert (14) according to claim 7, wherein the ramping edge angle is between 7° and 20°.

10. The milling insert (14) according to claim 1, wherein the milling insert (14) comprises a clamping bore (28) which opens out to the insert seating and top surfaces (20, 22), and said third axis (Z) passes through the clamping bore (28).

11. The milling insert (14) according to claim 1, wherein the first cutting edge (40) is formed at least at an intersection of the insert top surface (22) and a respective side surface (26).

12. The milling insert (14) according to claim 1, wherein at least portion of the first cutting edge (40) is helical.

13. The milling insert (14) according to claim 1, wherein the first cutting edge (40) comprises a main cutting edge (52) connected to a corner cutting edge (54).

14. The milling insert (14) according to claim 1, wherein at least a portion of the rake surface (38) extends inwardly.

15. The milling insert (14) according to claim 1, wherein the rake surface (38) comprises an inwardly extending first rake surface (46) and a second rake surface (48) which extends transversely therefrom.

16. The milling insert (14) according to claim 1, wherein the rake surface (38) comprises a ramping rake surface (50) which extends from the ramping cutting edge (44) towards the insert top surface (22).

17. The milling insert (14) according to claim 1, wherein the milling insert (14) comprises two insert support surfaces (64), each of which extends from the insert top surface (22) towards the insert seating surface (20).

18. A high speed milling tool (10) having a rotation axis (R) and comprising:
   a tool body (12) having a pocket (16), and
   the tangential milling insert (14) according to claim 1 secured in the pocket (16).

19. The high speed milling tool (10) according to claim 18, wherein:
   the pocket (16) comprises a pocket seating surface (66) oriented tangentially and pocket abutment and support surfaces (70, 72) extending transversely to the pocket seating surface (66), wherein
   the insert seating surface (20) abuts the pocket seating surface (66),
   at least a portion of the rake surface (38) abuts the pocket abutment surface (70), and
   the insert support surface 64 abuts the pocket support surface (72).

20. The high speed milling tool (10) according to claim 19, wherein:
   the milling insert (14) projects a maximum projection (M) from a tool body end (18) in the rotation axis (R) direction; and
   the maximum projection (M) is larger than a quarter of an insert length (L).

21. The high speed milling tool (10) according to claim 19 wherein the milling insert (14) is secured in the pocket (16)

via a screw which passes through an insert clamping bore (28) and is screw threaded into a threaded pocket bore (68) which opens out to the pocket seating surface (66).

22. A single-sided tangential ramping milling insert (14) for high speed milling comprising:
   opposite insert seating and top surfaces (20, 22);
   a peripheral surface (24) extending between the insert seating and top surfaces (20, 22) and comprising two opposite side surfaces (26);
   a reference plane (P) passing through the entire peripheral surface (24) midway between the seating and top surfaces (20, 22), the reference plane (P) defined by a first axis (X) passing midway between the side surfaces (26), and a second axis (Y) passing through the side surfaces (26) and intersecting the first axis (X);
   a clamping bore (28) which opens out to the insert seating and top surfaces (20, 22), the clamping bore (28) having a third axis (Z) perpendicular to the reference plane (P);
   wherein each of said opposite side surfaces (26) comprises:
   a first cutting edge (40) formed at an intersection of the side surface (26) and the insert top surface (22);
   a second cutting edge (42) connected to the first cutting edge (40) and extending transversely thereto in a direction of the insert seating surface (20);
   a ramping cutting edge (44) connected to the second cutting edge (42); and
   a rake surface (38) extending from at least a portion of the first cutting edge (40) towards the insert seating surface (20);
   wherein
   in a side view along the second axis (Y), a main cutting edge portion (52) of the first cutting edge (40), and a first ramping cutting edge portion (56) of the ramping cutting edge (44), are spaced apart from one another and converge outwardly, along the first axis (X); and
   the milling insert (14) has 180° rotational symmetry about a third axis (Z) which is perpendicular to the reference plane (P), but lacks 90° rotational symmetry about said third axis (Z), said opposite side surfaces (26) having 180° rotational symmetry with one another, about said third axis (Z).

23. A single-sided tangential ramping milling insert (14) for high speed milling comprising opposite insert seating and top surfaces (20, 22), and a peripheral surface (24) extending therebetween, the milling insert (14) having a reference plane (P) passing through the entire peripheral surface (24), midway between the seating and top surfaces (20, 22),
   the peripheral surface (24) comprising two opposite side surfaces (26) having a first axis (X) passing midway therebetween and lying in the reference plane (P), each side surface (26) comprising:
   a first cutting edge (40) formed at an intersection of the side surface (26) and the insert top surface (22),
   a second cutting edge (42) connected to the first cutting edge (40) and extending transversely thereto in a direction of the insert seating surface (20),
   a ramping cutting edge (44) connected to the second cutting edge (42) and extending further in said direction of the insert seating surface (20), the ramping cutting edge (44) and the first cutting edge (40) being spaced apart from one another in a side view of said each side surface (26); and
   a rake surface (38) extending from at least a portion of the first cutting edge (40) towards the insert seating surface (20),
   wherein
   the milling insert (14) comprises two ramping relief surfaces (60), each of which extends from the ramping cutting edge (44) of one side surface (26) towards the first cutting edge (40) of the opposite side surface (26); and
   at least portion of the first cutting edge (40) is helical.

24. A single-sided tangential ramping milling insert (14) for high speed milling comprising opposite insert seating and top surfaces (20, 22), and a peripheral surface (24) extending therebetween, the milling insert (14) having a reference plane (P) passing through the entire peripheral surface (24), midway between the seating and top surfaces (20, 22),
   the peripheral surface (24) comprising two opposite side surfaces (26) having a first axis (X) passing midway therebetween and lying in the reference plane (P), each side surface (26) comprising:
   a first cutting edge (40) formed at an intersection of the side surface (26) and the insert top surface (22),
   a second cutting edge (42) connected to the first cutting edge (40) and extending transversely thereto in a direction of the insert seating surface (20),
   a ramping cutting edge (44) connected to the second cutting edge (42) and extending further in said direction of the insert seating surface (20), the ramping cutting edge (44) and the first cutting edge (40) being spaced apart from one another in a side view of said each side surface (26); and
   a rake surface (38) extending from at least a portion of the first cutting edge (40) towards the insert seating surface (20),
   wherein
   the milling insert (14) comprises two ramping relief surfaces (60), each of which extends from the ramping cutting edge (44) of one side surface (26) towards the first cutting edge (40) of the opposite side surface (26); and
   the rake surface (38) comprises an inwardly extending first rake surface (46) and a second rake surface (48) which extends transversely therefrom.

* * * * *